US006850902B1

(12) United States Patent
Finch

(10) Patent No.: US 6,850,902 B1
(45) Date of Patent: Feb. 1, 2005

(54) METHOD FOR TRACKING INFORMATION AND TITLE HISTORY OF SELECTED EQUIPMENT

(76) Inventor: Vance Finch, P.O. Box 734, Ottawa, KS (US) 66067

( * ) Notice: Subject to any disclaimer, the term of this patent is extended or adjusted under 35 U.S.C. 154(b) by 877 days.

(21) Appl. No.: 09/504,502

(22) Filed: Feb. 15, 2000

Related U.S. Application Data

(63) Continuation-in-part of application No. 08/960,492, filed on Oct. 29, 1997, now abandoned.

(51) Int. Cl.$^7$ .............................................. G06F 17/60
(52) U.S. Cl. ......................... 705/28; 705/22; 235/385
(58) Field of Search ........................ 705/1, 4, 22, 28, 705/31, 38, 7, 30; 235/375, 385; 700/236

(56) References Cited

U.S. PATENT DOCUMENTS

| | | | | |
|---|---|---|---|---|
| 4,970,655 A | * | 11/1990 | Winn et al. | 700/235 |
| 5,285,383 A | * | 2/1994 | Lindsey et al. | 705/26 |
| 5,521,815 A | * | 5/1996 | Rose, Jr. | 705/28 |
| 5,899,978 A | * | 5/1999 | Irwin | 705/1 |

FOREIGN PATENT DOCUMENTS

JP          405100831 A   *   4/1993

OTHER PUBLICATIONS

PR Newswire Association, Inc., "Auto Trader Online Adds CarFax Vehicle History Service To Improve the Car Buying Experience", PR Newswire, p0513DETU022, May 13, 1997.*

Bob Golfen, "Title Scam is Buying Valley Car Buyers", Arizona Republic, p.: CL25, Feb. 24, 1996.*

Golfen Bob, Title Scam is Burning Valley Car Buyers, Feb. 24, 1996, Final Chaser, Classified, p.: CL25.*

Auto Trader On–line, Auto trader On–line Adds Carfax Vehicle History Service to Improve the Car Buying Experience, May 13, 1997, Newswire, Trade, P0513DETU022.*

* cited by examiner

*Primary Examiner*—Hani M. Kazimi
(74) *Attorney, Agent, or Firm*—Dale J. Ream

(57) ABSTRACT

A method and system for gathering, storing, and tracking title and specific farm, lawn, and industrial equipment information in a multiple user-level centralized computer system accessible by users of the Internet includes the steps of gathering and storing title data related to equipment ownership, including lender information, and specific product information such as hours of use and warranty information. The system authenticates users and thus regulates the type and scope of data access. If the user is determined to be unauthorized, the user is only permitted to view previously existing records. If the user is determined to be authorized, the user may input new records, update existing records, or request replacement of a lost title. Before issuance of a new or replacement title, records are checked as to lien status, theft status, and currency of relevant fee payments. Direct access by all Internet users to centrally stored title and product information related to farm, lawn, and industrial equipment provides a more accurate and efficient method for tracking relevant information.

16 Claims, 6 Drawing Sheets

METHOD FOR TRACKING INFORMATION AND TITLE HISTORY OF SELECTED EQUIPMENT

CROSS REFERENCE TO RELATED APPLICATIONS

This application is a continuation in part (CIP) of prior filed, application Ser. No. 08/960,492, filed Oct. 29, 1997, now abandoned entitled EQUIPMENT TRACKING SYSTEM.

BACKGROUND OF THE INVENTION

This invention relates to a method and system for gathering and storing information in a computerized database and, more particularly, a centralized computer system for tracking farm, lawn, and industrial equipment information and title history, using a relational database directly accessible by multiple levels of users through the Internet.

A need exists for a centralized, easily accessible computer database containing up-to-date information related to, among other things, the ownership, financing, and product-specific information of farm, lawn, and industrial equipment. One problem with the present system is that farm, lawn, and industrial equipment are not presently titled, thereby making tracking of ownership very difficult. Ownership is primarily tracked by lenders who have taken a security interest in financed equipment. The security interest is typically perfected by filing a U.C.C. form in the county records of the county of the owner's residence or with the Secretary of State of the owner's state, depending upon state law.

Although the state or county records can be searched by lenders, potential buyers, or other interested parties, the U.C.C. system has proven inadequate. U.C.C. forms are often filed with incorrect product serial numbers or no serial numbers at all. Further, no subsequent filings are required which would evidence release of a lien formally held by a lender. Thus, the lien status of used equipment is extremely difficult to ascertain, particularly where a seller is engaged in fraudulent activity. For example, a second owner of farm equipment may seek to finance his purchase of the equipment. The lender, unable to discern the lien status or title history, may unknowingly permit the equipment to be double financed if a lien incurred by the original owner has never been released. In the case of default by the second owner, the second lender cannot recover until the original lender's lien is satisfied pursuant to the priority provisions of U.C.C. Article 9. Therefore, it is desirable to provide both potential buyers and lenders with easy and instant access to an up-to-date and accurate title history, including financial data, related to farm, lawn, and industrial equipment.

A further problem is that there is currently no system to track product information desired by potential buyers and by insurers. For example, potential buyers of farm machinery are interested in information regarding the age and hours of usage of the machinery as well as warranty information. Insurers of farm, lawn, and industrial equipment are interested in the same information and are in a favorable position to gather and report the information. Once reported to a centralized computer database, the information would be directly accessible by all persons and entities with access to the Internet. A system to track vehicle titles and other articles of value was discussed in U.S. Pat. No. 5,521,815 to Rose. However, accurate title tracking is not ensured by the '815 system in that it does not compare the old ownership data from a bill of sale with the ownership data in the system's corresponding title record.

While the system proposed in the '815 patent contemplates tracking title information for vehicles and other articles of value, it does not provide for a multiple user-level system which would provide access not only to authorized institutional users, but direct access to potential buyers as well. Further, this patent does not contemplate storing specific product information such as warranty information. Thus, it is desirable to have a method and system for storing and tracking information specific to farm, lawn, and industrial equipment in a centralized computer database, and for providing a multiple user-level means of access to the system.

SUMMARY OF THE INVENTION

In response thereto, I have invented a method and system for gathering, storing, and tracking specific farm, lawn, and industrial equipment information using a centralized relational database accessible in multiple user-levels by anyone through the Internet.

The centralized computer database is easily accessible by all parties interested in transactions related to farm, lawn, and industrial equipment, including potential purchasers, dealers, lenders, insurance companies, law enforcement agencies, etc. Interested parties are connected via the Internet to a client-server computer system which utilizes a World Wide Web hypertext user interface. My invention utilizes a multiple user-level structure to ensure proper authentication and authorization of users. All users who access the system via the Internet are permitted to view equipment title history records. Only registered users, however, are authorized to input new data, update existing data, or request replacement titles.

My invention is comprised in part of a computer implemented method for providing a direct database access to all persons or parties interested in farm, lawn, and industrial equipment transactions rather than only to institutional users using a more limited form of access such as dial-up or hard-wired connections. This previously unavailable level of access to otherwise disparate information is now possible due to the advent and advancement of Internet technology. The Internet, a system of interconnected computer networks facilitating global communication, and more specifically, the world wide web and the hypertext transfer protocol, has created an environment allowing individuals and organizations using otherwise incompatible computer systems to communicate, conduct commercial transactions, engage in entertainment, and locate an exponentially expanding variety of information. Access to the Internet has become widespread and economical. Such access is available to the home computer user at rates comparable to cable television. In fact, Internet access is even becoming available as part of the cable television transmission.

All forms of electronic communication for transfer and storage of sensitive data, however, carry a level of risk that the data will be unscrupulously monitored and/or corrupted. Fortunately, technology is known and available to protect web servers from data corruption, to protect Internet transmissions by encrypting the same, and to authenticate and regulate users of a World Wide Web server system.

The present invention, however, provides a method to ensure data security. Once a user accesses the centralized database, the computer determines the desired function and authenticates the user. The non-registered user is permitted to input a title history file identifier, such as a serial number or title number, and view the history file if the requested record exists. The database has predetermined storage locations to store at least the following information in the title history record: serial number, make, model, year of manufacture, warranty information, purchase price, owner information inclusive of old owner information, dealer information, lender/financing information, insurance information, and theft status. If the user is registered with the company administering this system, the user may input a new equipment record based on original manufacturer data, update an existing record, or request a replacement title. These functions as referred to as allowing a registered user to "fashion" a record. When a new record is input, a unique title number is assigned and stored in the title history file.

Before permitting issuance of a new title, the computer performs a series of checks to be sure the equipment is not stolen, not subject to outstanding liens, and that relevant fees have been paid. If no title problems are encountered, the updated title is displayed exactly as it would appear in hard copy format, thus allowing the authorized user to print the title locally on official title certificates. Liens and other relevant information may be printed on the title certificate itself. If the user has no means to print the title locally, the title may be printed at the central title company and mailed to the appropriate owner or entity.

It is thereby a general object of this invention to provide a method for gathering and storing product and title information related to farm, lawn, and industrial equipment.

It is another object of this invention to provide a centralized computer system for maintaining said product and title information related to farm, lawn, and industrial equipment.

It is still another object of this invention to provide a method, as aforesaid, of ensuring the security of data stored in the system.

It is another object of this invention to provide a multiple user-level method, as aforesaid, of access to the system.

It is another object of this invention to provide a means of direct access to all users who access the system through the Internet, enabling said users to view all title history and product information housed on the system.

It is a further object of this invention to provide a means of access to a plurality of authorized users, as aforesaid, enabling said users to input data related to farm, lawn, and industrial equipment, input and view updated data, or request issuance of a new title.

It is yet another object of this invention to protect financial institutions against fraudulent loan transactions, such as double financing of the same item of equipment.

It is a still further object of this invention to protect insurers from theft-related fraud.

It is yet another object of this invention to assist police and owners in identifying stolen equipment and preventing theft-related fraud.

It is yet another object of this invention to provide a national system of titling farm, lawn, and industrial equipment so as to reduce fraud involved in the titling process.

Other objects and advantages of this invention will become apparent from the following description taken in connection with the accompanying drawings, wherein is set forth by way of illustration and example, now preferred embodiments of this invention.

DESCRIPTION OF THE PREFERRED EMBODIMENT

Figure 1:
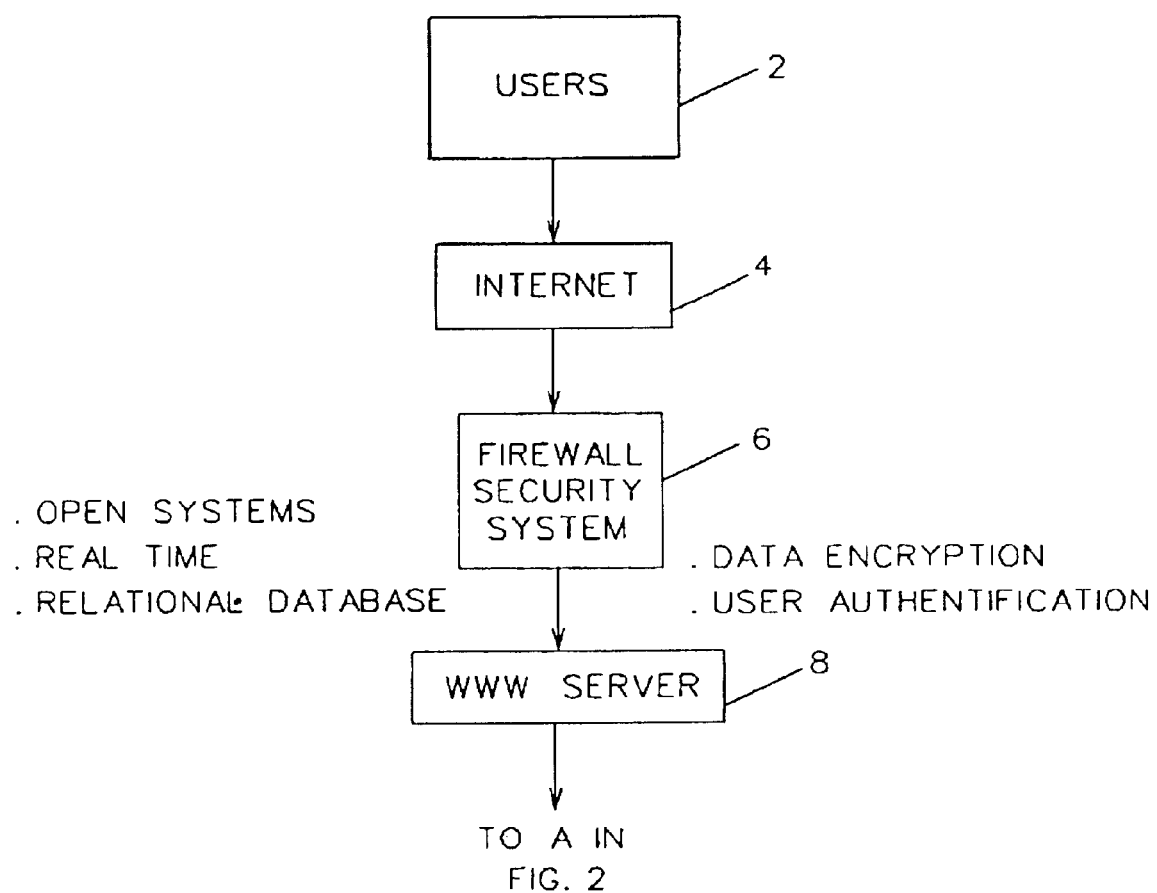
FIG. 1 is a flow diagram of a client-server system accessible by users via the Internet.
Figure 2:
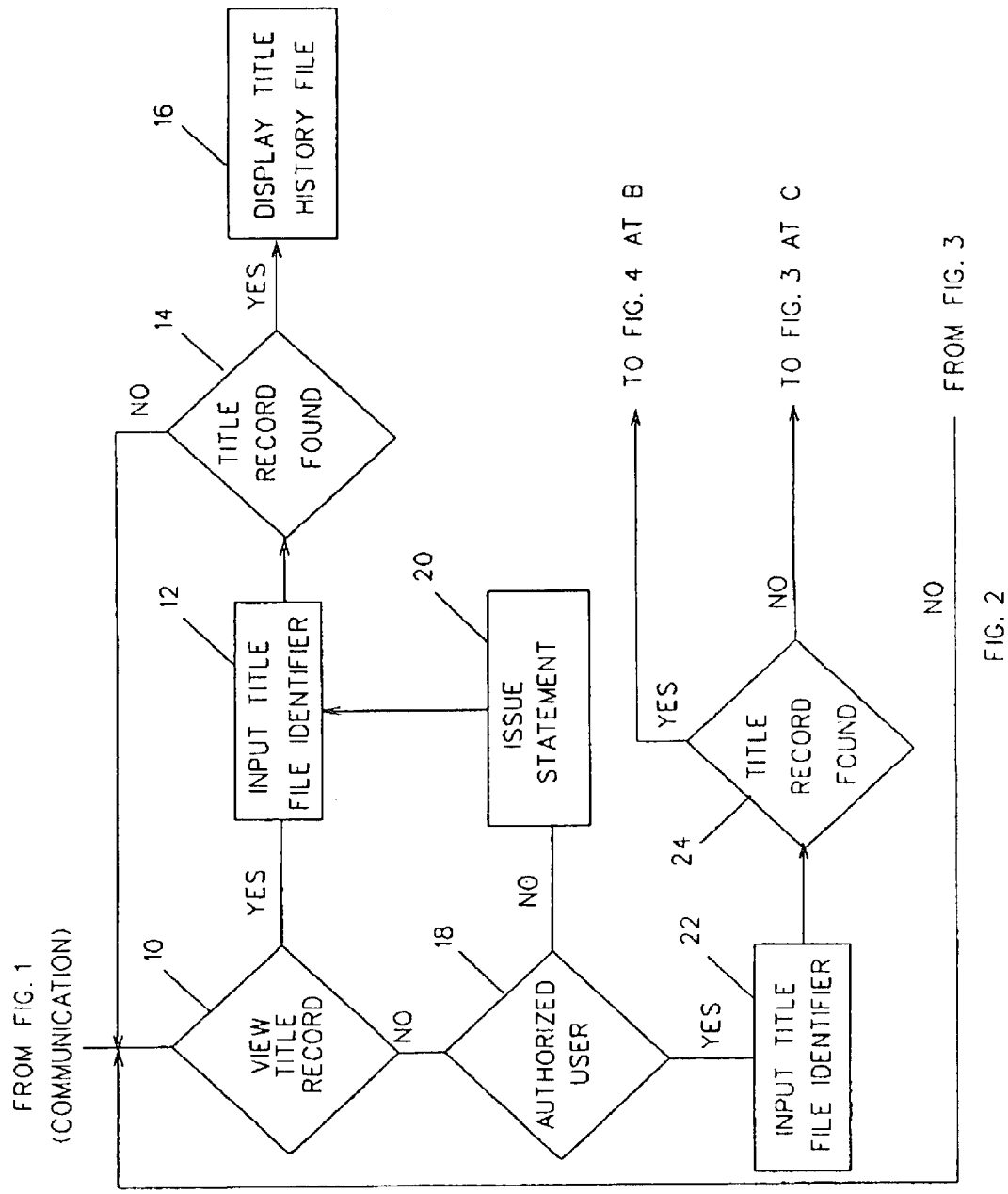
FIG. 2 is a flow chart generally showing the method for providing multiple user-level access to the server and to determine the requested user function.

Turning more particularly to the drawings, FIGS. 1–6 show a logic flow of the invention which generally describes a method and system for tracking title and product information relevant to farm, lawn, and industrial equipment. The system is comprised of a centralized relational database operating in an open systems environment accessible by any computer system connected to the Internet.

Data stored in this system is protected by a multi-level "firewall" server system 6 through which all Internet transmissions are monitored. Attempts at unauthorized access to the database are detected and prevented by the firewall. Additional security is provided through encryption of outgoing transmissions by the database to remote users. Further, security is enhanced through a method of user authentication which establishes, maintains, and controls the level of access and privileges of a user. It is understood that while user authentication may utilize a public/private key system or smart-card technology, this invention is not limited to those methods.

Once a user has accessed the system through the Internet, the computer checks whether the user desires to view an existing title history record 10. If so, a title file identifier such as a title number, serial number, owner name, owner social security number or federal identification number (FID) is input 12. The computer then checks to see if the identifier matches any record stored on the system 14. If so, the title and product history file is displayed 16.

Figure 3:
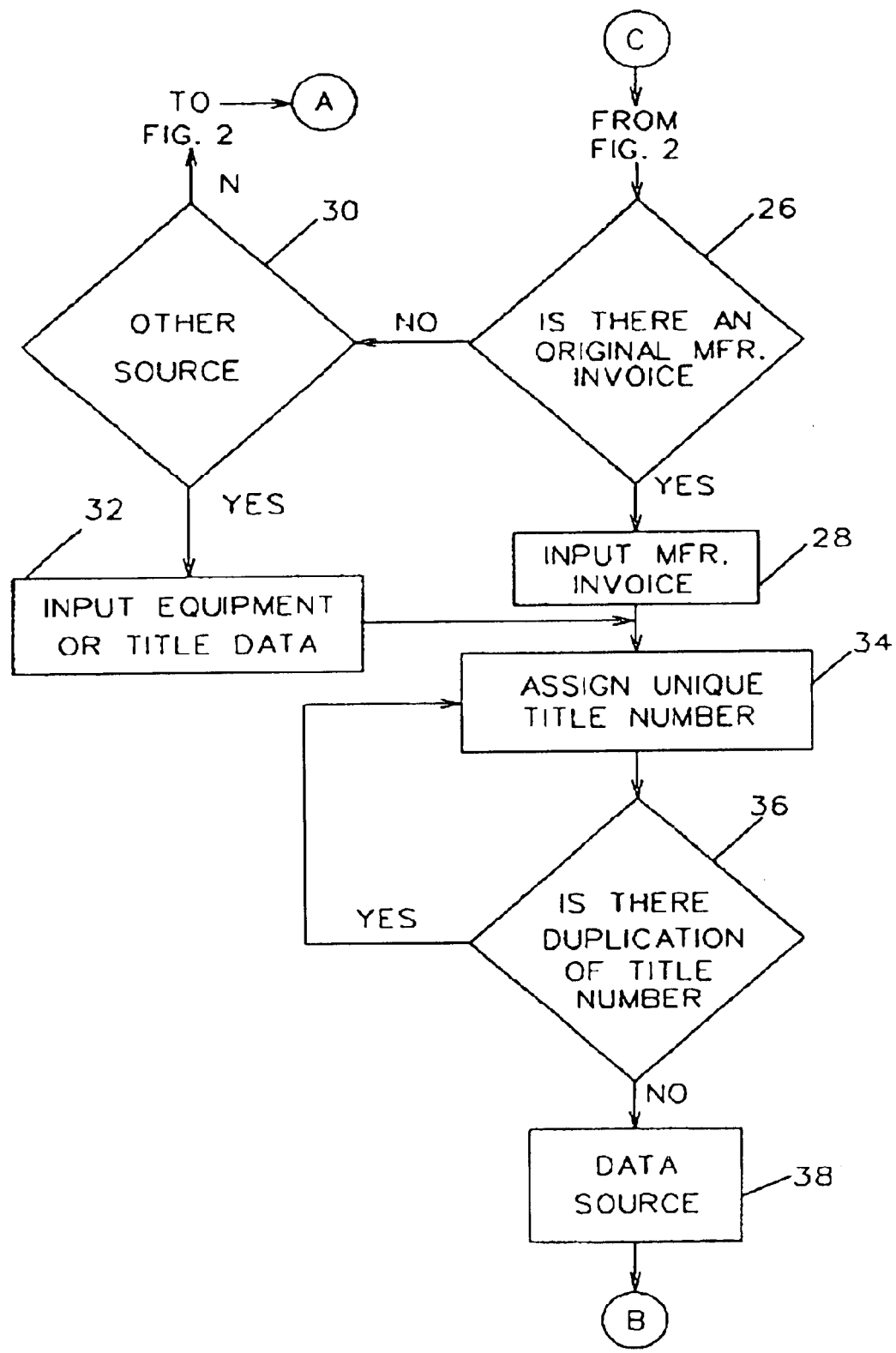
FIG. 3 is a flow chart showing the method for gathering data with which to create a new title history record.

If the user did not desire to view an existing record 10, then the computer checks to see if access to the remaining functions of the system are authorized 18. If the user is not authorized to modify records, a statement to that effect is issued 20 and the "view title record" routine is accessed, permitting the user to input a title file identifier and view an existing record 12, 14, 16. (The title history 16 may include a series of title records including the latest and previous title records.) If the user is authorized 18, a title file identifier is input 22. The computer searches the database to determine whether the equipment is already in the database 24. If not, the computer begins a routine for creating a new title record (FIG. 3). The computer asks if an original manufacturer's invoice exists for the equipment 26. If so, information from the manufacturer's invoice is input 28, such as equipment serial number, make, model, year of manufacture, hours of use, warranty information, and dealer information. If no manufacturer's original invoice is available, the computer asks if another source of relevant information is available 30. If another source for the above information exists, it is input at this stage 32. It should be appreciated that the creation of a new title record includes entry of ownership information which is compared to later sales transaction information, including ownership information, and is updated accordingly, as to be more fully described below.

The computer then assigns a unique title number to the equipment 34. It is understood that a sequential numbering system may be used to assign unique title numbers to equipment added to the system. Another possible method would be to apply a mathematical function to the serial number to generate a unique title number. It is understood that while the system may utilize these means for generating unique title numbers, it is not limited to use of these means. The computer then scans the database to ensure there is no duplication of the title number 36. If a duplicate is found, the computer assigns a new title number or rechecks the data and recalculates the number 34. When no duplicate is found 36, the computer creates a new title history record and stores all of the input data in predetermined storage locations 38.

Figure 4:
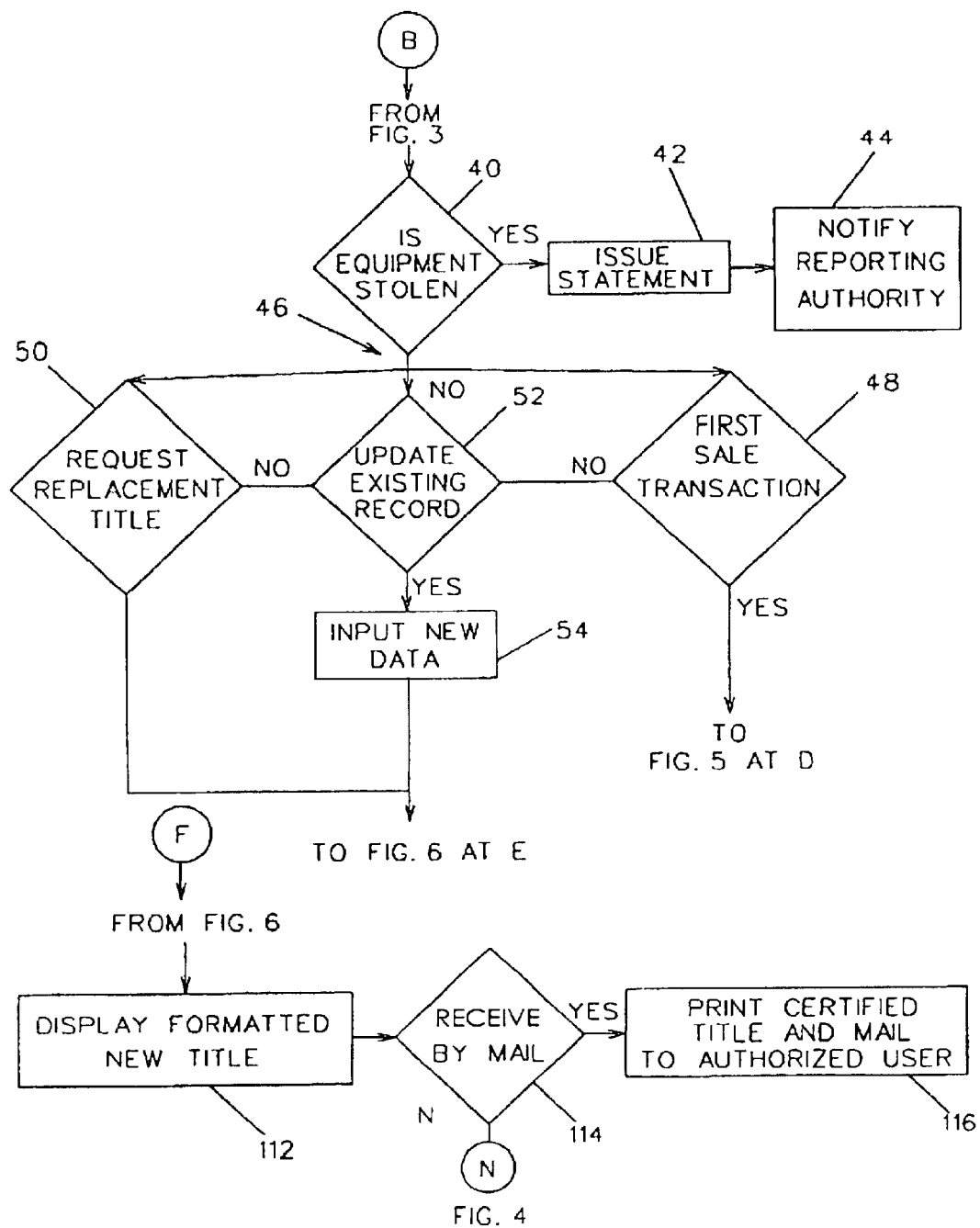
FIG. 4 is a flow chart showing the method for more specifically determining the desired user function and for gathering owner information in a used equipment sale transaction.

At this stage, or if the title record identifier was already on the system 24, the computer proceeds to FIG. 4 and scans the database for equipment reported as stolen 40. If the present equipment has previously been reported stolen, a statement is issued 42 and the entity which reported the equipment stolen is notified 44.

If the equipment is not reported as stolen 40, then a decision tree 46 is accessed to determine the type of transaction being requested. If the transaction involves the sale and transfer of ownership of an item of equipment 48, then the computer accesses the routine described in FIG. 5, described more fully below. If the transaction involves an update to an existing title history record 52, the new data is input 54. An update to an existing record may be a change of address, change in lender/financing information such as a lien release, change in theft status, insurance information, registration fees, taxes, or any other information stored in the record other than change of ownership. At this stage, or if the transaction involves a request for a replacement title 50, the computer proceeds to FIG. 6, described more fully below.

Figure 5:
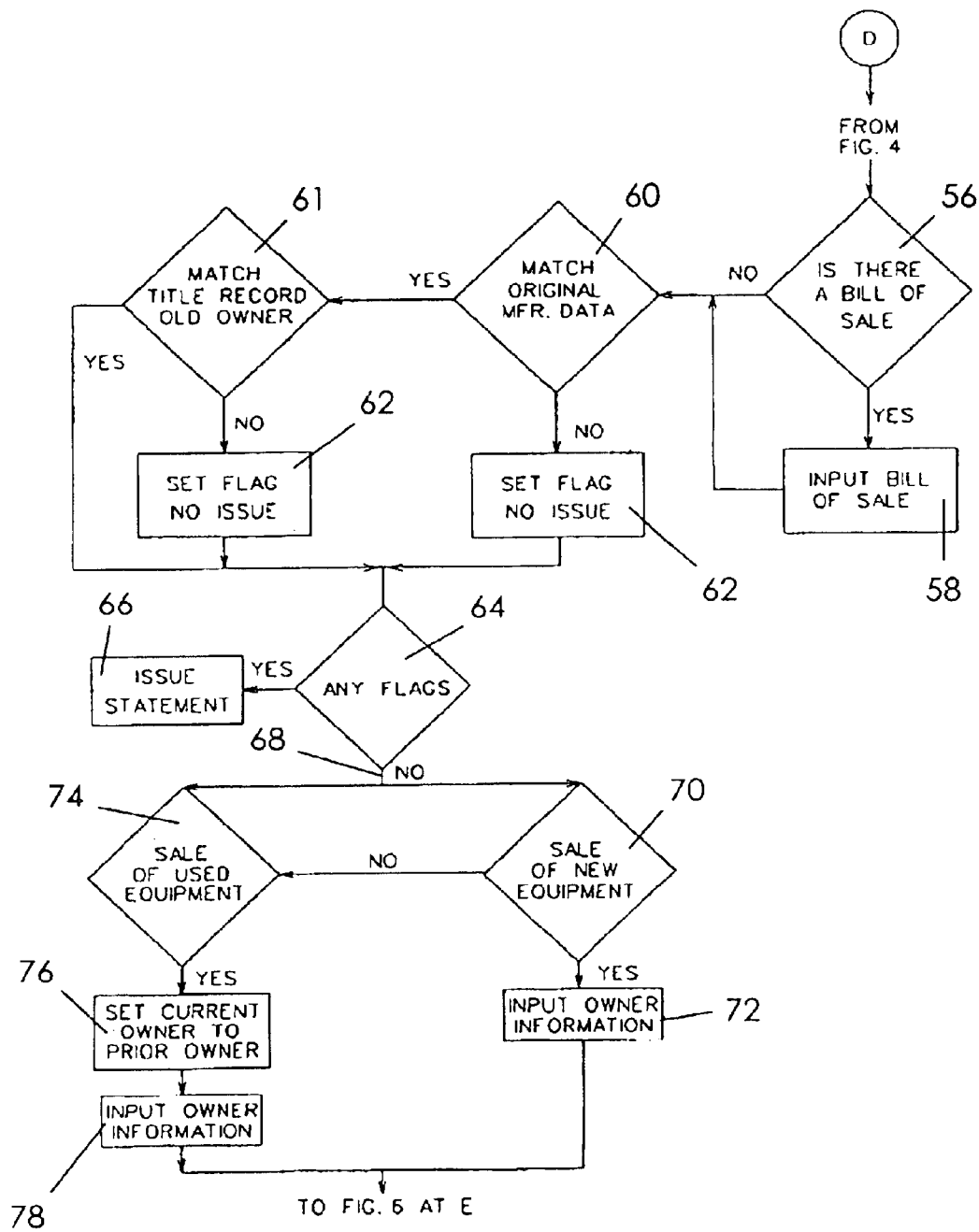
FIG. 5 is a flow chart showing the method for gathering data in a new equipment sale transaction.
Figure 6:
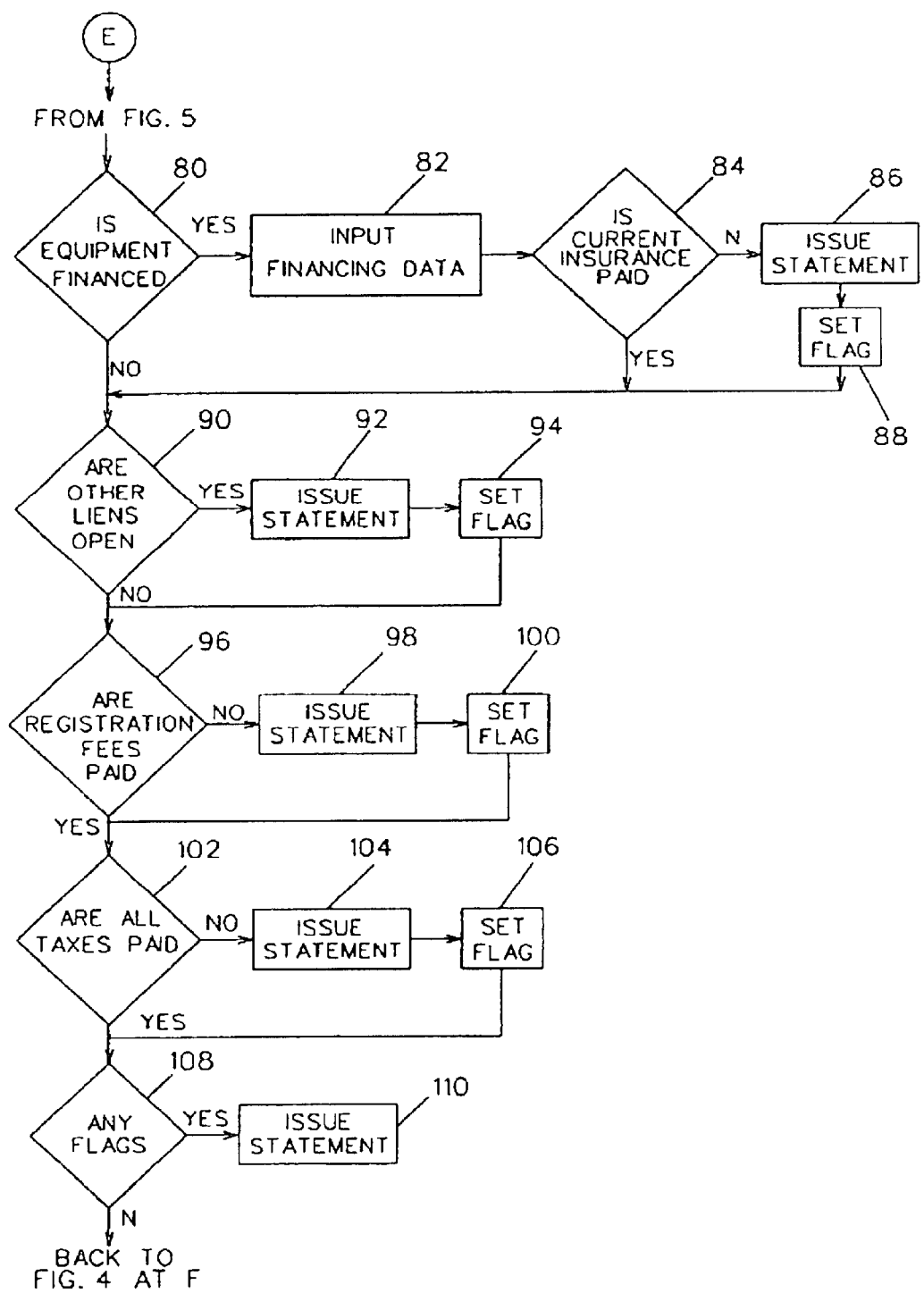
FIG. 6 is a flow chart showing the method for verifying that all conditions exist for issuance of a new title certificate.

Turning now to FIG. 5 which relates to a sale transaction, the computer asks whether a bill of sale exists 56. If so, information from the bill of sale is input 58, such as date of sale, purchase price, purchaser's name (new owner), seller's name (old owner), hours of use on the equipment, and any other relevant information. Next, the computer checks whether the information input from the bill of sale thus far related to the equipment matches the information in the title record 61 including original manufacturer data 60. In other words, the bill of sale is compared not only to the original manufacturer's invoice information, but also to the old ownership data in the title record. If the bill of sale information does not match the information in the title record, the computer sets a flag in a predetermined storage location to indicate that no new title should issue 62. The computer then checks the status flags to determine whether to continue 64. If a flag was set (e.g., bill of sale data does not match title record data), then a statement is issued 64.

If no flags are set 64, the computer proceeds to decision tree 68 to determine whether the present transaction relates to the sale of new equipment or used equipment. If the transaction is the purchase of new equipment 70, the new owner information is input 72. If the transaction represents the sale of used equipment 74, the data currently stored as "current owner" is moved to a storage location designated for "prior owners" 76 and the new owner information is input 78. Whether the transaction is a sale transaction 48, an update transaction 52, or a request for a replacement title 50, the computer proceeds to the routine in FIG. 6.

First, the computer asks whether the equipment is being financed 80. If so, the financing and lender information is input 82. Insurance information may be input at this stage as well. If the equipment is subject to a financial lien, the computer asks whether the current insurance premium has been paid 84. If not, a statement is issued 86 and a flag is set in a predetermined storage location 88. Next, the computer checks the title history record to determine if other liens are still open 90. If so a statement is issued 92 and a flag is set 94. Next, the computer asks whether title registration fees have been paid 96. If not, a statement is issued 98 and a flag is set 100. Next, the computer asks whether all relevant taxes have been paid 102. If not, a statement is issued 104 and a flag is set 106. The computer then examines the predetermined storage locations to determine whether any flags were set indicating a title should not be issued 108. If so, a statement is issued stating the particular conditions that must be remedied before title can issue 110. Otherwise, control is returned to FIG. 4.

The title is then displayed exactly as it would appear in hard copy form 112. Authorized users can then print the screen from their World Wide Web browser onto official certificates and distribute to the appropriate owner or entity. The computer also asks whether a hard copy of the title should be sent by mail 114. If so, the title is printed on an official certificate at the centralized location and mailed to the appropriate owner or entity 116.

It is to be understood that while a certain form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. A computer-implemented method of operation for a user production of a title record of preselected data associated with an equipment piece transaction comprising the steps of:

a. providing a title record format for data to be associated with a transaction of an equipment piece;

b. providing a database for storing a plurality of title records with said format therein;

c. placing said database in a central computer available for access by a plurality of users on a computer network;

d. determining whether a user on the network is authorized to fashion a title record in said database, otherwise displaying a selected title record for viewing only to the user on the computer network;

e. if said user is authorized to fashion a title record, accessing said title record from said database for a particular equipment piece;

f. if said title record for said equipment piece is not in said database, creating a new title record for said equipment piece by entering said data to be associated with said equipment piece inclusive of ownership from an available outside source into said new title record;

g. if the transaction of said equipment piece is a sale transaction, choosing data from an available bill of sale inclusive of at least old ownership data for comparison with corresponding ownership data in said title record;

h. comparing said chosen bill of sale data to said corresponding data in said title record inclusive of at least said old ownership data previously entered in said title record;

i. upon a match of said data in step h., entering at least data from said bill of sale indicative of a new owner into said new title record;

j. determining whether any collateral information associated with said equipment and entered into said title record would preclude the issuance of an owner's title; and k. if not precluded, issuing said title record in a form indicative of ownership of said equipment piece.

2. The method as claimed in claim 1 wherein if said transaction of said equipment piece is other than a sale transaction in step g., inputting any new data from an outside source into said title record to be associated with said equipment and proceeding to step j.

3. The method as claimed in claim 1 wherein said collateral information comprises:
   information indicative that said equipment is financed; and
   information indicative that insurance on said equipment is not in force.

4. The method as claimed in claim 1 wherein said collateral information comprises information indicative that a lien exists on said equipment.

5. The method as claimed in claim 1 wherein said collateral information comprises information indicative that registration fees have not been paid.

6. The method as claimed in claim 1 wherein said collateral information comprises information indicative that taxes on said equipment have not been paid.

7. The method as claimed in claim 1 wherein said collateral information comprises information that said equipment piece has been reported stolen.

8. The method as claimed in claim 1 wherein said collateral information is displayed on a screen to a user.

9. A computer-implemented method of operation for a user production of a title record of preselected data associated with an equipment piece transaction comprising the steps of:
   a. providing a title record format having data fields for user entry therein of information to be associated with a transaction of a selected equipment piece;
   b. providing a database for storing a plurality of title records with said format therein;
   c. placing said database in a central computer available for access by a plurality of users on a computer network;
   d. accessing a title record corresponding to said selected equipment piece from said database for viewing only;
   e. otherwise, if a user is authorized to fashion a title record, allowing said user to perform steps of said method as follows;
   f. if said title record for said equipment piece is not in said database, creating a new title record for said equipment piece by entering preselected data inclusive of ownership information associated with said equipment piece into a new title record to correspond with said equipment piece;
   g. if said transaction is a sale transaction of said equipment, entering preselected data inclusive of new ownership data from an existing bill of sale into said title record upon verification of old ownership data in said bill of sale with ownership data in said title record;
   h. said step (g) including comparing said bill of sale data, including old ownership data therein, to corresponding data previously entered into said title record including old ownership data;
   i. upon a match of at least said old ownership data between said bill of sale and title record, entering new owner data from said bill of sale data into said title record;
   j. determining whether any collateral information associated with said equipment in said title record would preclude the issuance of an owner's title;
   k. if not precluded, issuing said title record in a form indicative of ownership of said equipment piece.

10. The method as claimed in claim 9 wherein if said transaction of said equipment piece is other than a sale transaction in step g., inputting any new data from an outside source into said title record associated with said equipment and proceeding to step j.

11. The method as claimed in claim 9 wherein said collateral information comprises:
    information indicative that said equipment is financed; and
    information indicative that insurance on said equipment is not in force.

12. The method as claimed in claim 9 wherein said lien exists collateral information comprises information indicative that a on said equipment.

13. The method as claimed in claim 9 wherein said collateral information comprises information indicative that registration fees have not been paid.

14. The method as claimed in claim 9 wherein said collateral information comprises information that taxes on said equipment have been paid.

15. The method as claimed in claim 9 wherein said collateral information is displayed to a user.

16. A computer-implemented method of operation for a user production of a title record of preselected data associated with an authorized equipment piece transaction comprising the steps of:
    a. providing a computer database for multi-user access having a plurality of title records depicting preselected information inclusive of ownership of equipment pieces;
    b. accessing a title record corresponding to a selected equipment piece from said database for viewing only;
    c. if a user is authorized to fashion a title record, allowing said user to perform subsequent steps of said method on said accessed title record;
    d. entering preselected data associated with said equipment piece from outside sources into said title record;
    e. if said authorized transaction is a sale of said equipment, examining new sales-oriented data inclusive of purchase and seller data from outside sale transaction sources prior to entry into said title record;
    f. comparing said new sales data inclusive of the seller data in step (e) about said equipment piece with previous information in said title record inclusive of ownership data in said title record;
    g. upon a match of said data inclusive of the seller data with said ownership data in said title record, entering said new sales data inclusive of a purchaser identifying data into said ownership data of said title record;
    h. if not a sale transaction, entering any new data from outside sources into said title record;
    i. determining whether any collateral information associated with said equipment piece in said title record would preclude the issuance of a title to an owner of said equipment piece;
    j. if not precluded, issuing said title from said information in said title record in a form indicative of ownership of said equipment piece.

* * * * *